United States Patent
Cha et al.

(10) Patent No.: US 9,911,979 B2
(45) Date of Patent: Mar. 6, 2018

(54) BINDER FOR BATTERY, AND ANODE AND LITHIUM BATTERY INCLUDING THE SAME

(71) Applicant: Samsung SDI Co., Ltd., Yongin-si, Gyeonggi-do (KR)

(72) Inventors: Jun-Kyu Cha, Yongin-si (KR); Beom-Wook Lee, Yongin-si (KR); Bum-Jin Chang, Yongin-si (KR); Myoung-Sun Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 758 days.

(21) Appl. No.: 14/184,454

(22) Filed: Feb. 19, 2014

(65) Prior Publication Data

US 2014/0231719 A1  Aug. 21, 2014

(30) Foreign Application Priority Data

Feb. 20, 2013 (KR) ........................ 10-2013-0018254

(51) Int. Cl.
| | |
|---|---|
| *H01M 4/62* | (2006.01) |
| *H01M 10/052* | (2010.01) |
| *H01M 4/38* | (2006.01) |
| *H01M 4/134* | (2010.01) |

(52) U.S. Cl.
CPC ........... *H01M 4/622* (2013.01); *H01M 4/134* (2013.01); *H01M 4/386* (2013.01)

(58) Field of Classification Search
CPC .................................................. H01M 4/622
USPC ..................................................... 252/182.1
See application file for complete search history.

(56) References Cited

U.S. PATENT DOCUMENTS

| | | | |
|---|---|---|---|
| 5,207,950 A | 5/1993 | Ehrreich | |
| 5,695,920 A | 12/1997 | Anderson et al. | |
| 5,824,434 A * | 10/1998 | Kawakami | H01M 2/14 429/209 |
| 6,391,492 B1 * | 5/2002 | Kawakami | H01M 2/30 429/124 |
| 6,750,270 B1 | 6/2004 | Klostermann et al. | |
| 8,637,609 B1 | 1/2014 | Perumal et al. | |
| 2002/0147253 A1 | 10/2002 | Kita et al. | |
| 2003/0175588 A1 * | 9/2003 | Zhang | H01M 4/0404 429/217 |
| 2006/0019088 A1 | 1/2006 | Wang et al. | |
| 2006/0030651 A1 | 2/2006 | Kubish et al. | |
| 2006/0281009 A1 * | 12/2006 | Boyer | C08K 9/04 429/247 |
| 2007/0178373 A1 | 8/2007 | Hwang et al. | |
| 2007/0196647 A1 | 8/2007 | Yokoyama et al. | |
| 2007/0225401 A1 | 9/2007 | Sarkisian et al. | |
| 2009/0023065 A1 | 1/2009 | Hwang et al. | |
| 2011/0242796 A1 | 10/2011 | Yang et al. | |
| 2012/0189915 A1 | 7/2012 | Cho et al. | |
| 2012/0244435 A1 | 9/2012 | Hirose et al. | |
| 2013/0209882 A1 * | 8/2013 | Kim | C08K 5/5406 429/217 |
| 2013/0230768 A1 * | 9/2013 | Sakamoto | H01M 4/621 429/188 |
| 2013/0252066 A1 * | 9/2013 | Yeou | H01M 2/166 429/144 |
| 2013/0323592 A1 | 12/2013 | Lee et al. | |
| 2014/0058030 A1 | 2/2014 | Johnston et al. | |
| 2014/0231719 A1 * | 8/2014 | Cha | H01M 4/622 252/503 |
| 2014/0239239 A1 | 8/2014 | Cha et al. | |
| 2015/0072080 A1 | 3/2015 | Prieto et al. | |

FOREIGN PATENT DOCUMENTS

| | | |
|---|---|---|
| JP | 2011-49046 A | 3/2011 |
| JP | 2011-134584 A | 7/2011 |
| KR | 10-2004-0078927 A | 9/2004 |
| WO | WO 2012/002396 A1 | 1/2012 |
| WO | WO 2012002396 A1 * | 1/2012 ............ H01M 4/621 |

OTHER PUBLICATIONS

Witcobond® Dispersions for Coatings, Adhesives and Textile Binders, *Chemtura Corporation* © 2009, 2 pages.
Korean Office Action dated Aug. 28, 2016, for Korean Patent Application No. KR 10-2013-0018254.

* cited by examiner

*Primary Examiner* — Nicole M Buie-Hatcher
*Assistant Examiner* — M. Reza Asdjodi
(74) *Attorney, Agent, or Firm* — Knobbe Martens Olson & Bear LLP

(57) ABSTRACT

A binder for a battery including polymethyl methacrylate particles and a binder polymer is disclosed. Additionally, a binder composition, and an anode and a lithium battery which include the binder are also disclosed.

13 Claims, 1 Drawing Sheet

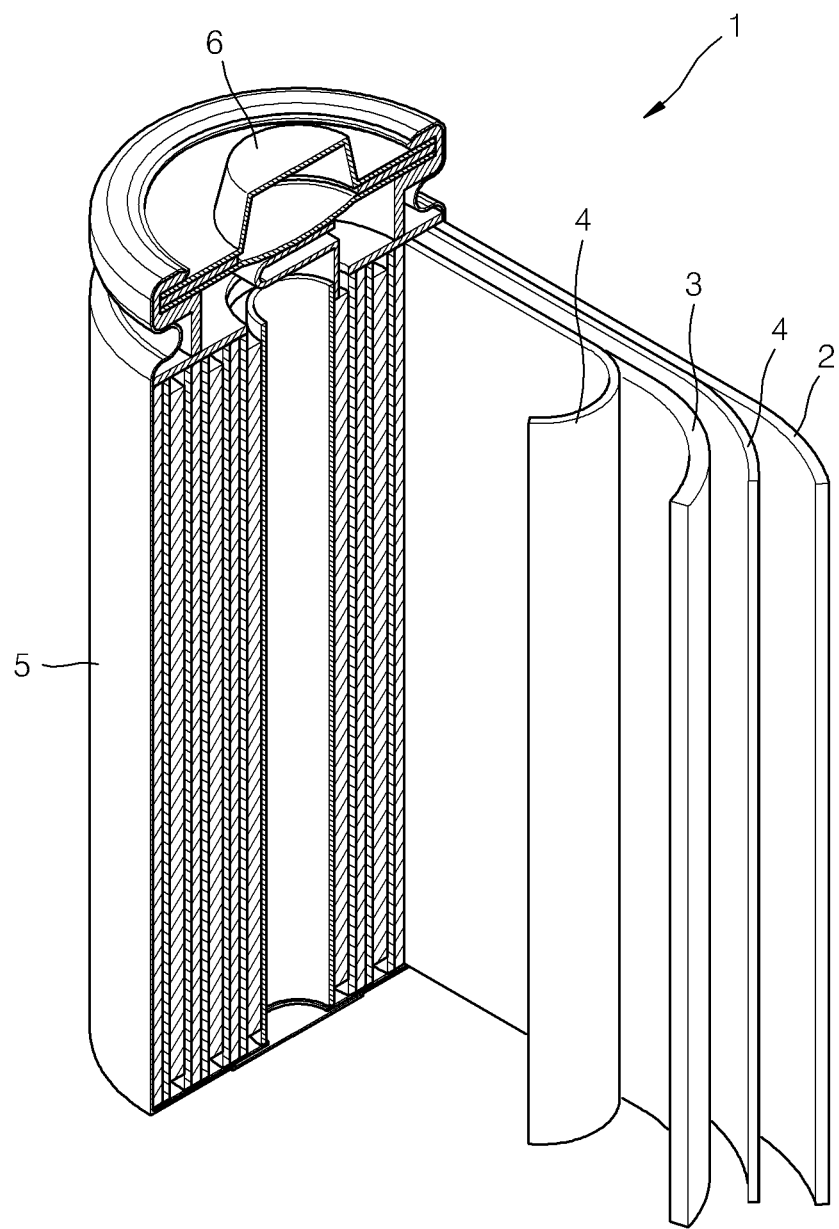

BINDER FOR BATTERY, AND ANODE AND LITHIUM BATTERY INCLUDING THE SAME

CROSS-REFERENCE TO RELATED APPLICATIONS

Any and all priority claims identified in the Application Data Sheet, or any correction thereto, are hereby incorporated by reference under 37 CFR 1.57. For example, this application claims the benefit of Korean Patent Application No. 10-2013-0018254, filed on Feb. 20, 2013, the disclosures of which are incorporated herein by reference in their entirety.

BACKGROUND

Field

The present invention relate to a binder for a battery, and an anode and a lithium battery including the same.

Description of the Related Technology

Lithium batteries are used in various applications due to their high voltage and high energy density characteristics. For example, in the field of electric vehicles such as hybrid electric vehicles (HEVs) and plug-in hybrid electric vehicles (PHEVs), because the battery is required to operate at a high temperature, provide a large amount of electricity during charge or discharge, and have a prolonged operation time. A lithium battery having excellent discharge capacity and life characteristics is needed meet these requirements.

The carbon-based material is porous and is stable because of its small volume change during charging and discharging. However, the capacity of the battery using the carbon-based material is generally low due to the porous structure of carbon. For example, the theoretical capacity of graphite having high crystallinity is about 372 mAh/g for a $LiC_6$ composition.

The metal alloyable with lithium may be used as an anode active material having a high capacity in comparison to the carbon-based material. Examples of metals alloyable with lithium include silicon (Si), tin (Sn), aluminum (Al), etc. However, the metals alloyable with lithium can easily deteriorate and have short battery life. For example, in the case of Sn, Sn particles are electrically isolated by repeated aggregation and crushing processes during the repeated charge and discharge.

Therefore, a binder, which may increase the battery life characteristics of a lithium battery by accommodating and/or inhibiting the volume change of the above non-carbon-based anode active material, is in demand.

SUMMARY OF CERTAIN INVENTIVE ASPECTS

One aspect of the present disclosure relates to a binder for a battery which has increased strength.

One or more embodiments of the present disclosure include a binder composition for a battery.

One or more embodiments of the present invention include an anode including the binder.

One or more embodiments of the present invention include a lithium battery using the anode, wherein the anode contains the binder described herein.

Additional aspects will be set forth in part in the description which follows and, in part, will be apparent from the description, or may be learned by practice of the presented embodiments.

One aspect of the present disclosure relates to a binder for a battery, the binder comprising polymethyl methacrylate particles; and a binder polymer.

In some embodiments, an average particle diameter of the polymethyl methacrylate particles is in the range of about 10 nm to about 200 nm.

In some embodiments, the weight ratio of the polymethyl methacrylate particles to the binder polymer is in the range of about 100:10 to about 100:60.

In some embodiments, the binder for the battery has one or more glass transition temperatures.

In some embodiments, the binder for the battery has one or more glass transition temperatures of about 60° C. or less.

In some embodiments, the glass transition temperature of the binder for the battery is in the range of about −50° C. to about 60° C.

In some embodiments, the polymethyl methacrylate particles in the binder for the battery are crosslinked polymethyl methacrylate particles that do not have a glass transition temperature.

In some embodiments, the binder further comprises a coupling agent.

In some embodiments, the coupling agent is a silane-based compound.

In some embodiments, the coupling agent is a hydrolysate of a silane coupling agent.

In some embodiments, the silane coupling agent comprises one or more selected from the group consisting of an alkoxy group, a halogen group, an amino group, a vinyl group, a glycidoxy group, and a hydroxyl group.

In some embodiments, the silane coupling agent comprises one or more selected from the group consisting of vinylalkylalkoxysilane, epoxyalkylalkoxysilane, mercaptoalkylalkoxysilane, vinylhalosilane, and alkylacyloxysilane.

An additional aspect of the present disclosure relates to a binder composition for a battery comprising: polymethyl methacrylate particles; binder polymer particles; and a solvent.

In some embodiments, the polymethyl methacrylate particles are included in an amount of about 10 parts by weight to about 60 parts by weight based on 100 parts by weight of the binder polymer particles.

In some embodiments, an average particle diameter of the polymethyl methacrylate particles is in the range of about 10 nm to about 200 nm.

In some embodiments, an average particle diameter of the binder polymer particles is in the range of about 50 nm to about 500 nm.

One more aspect of the present disclosure relates to an anode comprising: an anode active material; and the binder for the battery of any one of claim 1.

In some embodiments, the binder for the battery in which polymethyl methacrylate particles are dispersed.

In some embodiments, the anode active material comprises one or more selected from the group consisting of silicon (Si), tin (Sn), lead (Pb), germanium (Ge), aluminum (Al), $SiO_x$ (0<x≤2), $SnO_y$ (0<y≤2), $Li_4Ti_5O_{12}$, $TiO_2$, $LiTiO_3$, and $Li_2Ti_3O_7$.

In some embodiments, the anode active material further comprises a carbon-based anode active material.

One more aspect of the present disclosure relates to a lithium battery using the anode described herein.

BRIEF DESCRIPTION OF THE DRAWINGS

FIG. 1 is a schematic diagram of a lithium battery according to an exemplary embodiment.

DETAILED DESCRIPTION OF CERTAIN INVENTIVE EMBODIMENTS

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Hereinafter, a binder for a battery, a binder composition, an anode including the binder, and a lithium battery using the anode are described in more detail.

In some embodiments, a binder for a battery may include polymethyl methacrylate particles and a binder polymer. Since the binder for the battery may have high strength by including the polymethyl methacrylate particles, the binder for the battery may accommodate and/or inhibit the volume change of an anode active material during charge and discharge. Thus, the cycle characteristics of a lithium battery including the binder may be improved.

In particular, the binder for a battery may maintain a high elastic modulus by including the polymethyl methacrylate particles at a high temperature of about 50° C. or more. In particular, the binder for a battery may maintain a high elastic modulus at a high temperature of about 60° C. or more. The binder for a battery is substantially in the state of having no solvent, in which the binder polymer does not have any particular form and may act as a kind of a matrix.

The average particle diameter of the polymethyl methacrylate particles in the binder may be in the range of about 10 nm to about 200 nm. For example, the average particle diameter of the polymethyl methacrylate particles may be in the range of about 10 nm to about 100 nm. For example, the average particle diameter of the polymethyl methacrylate particles may be in the range of about 20 nm to about 100 nm. When the average particle diameter of the polymethyl methacrylate particles is excessively small, preparation may become difficult. When the average particle diameter of the polymethyl methacrylate particles is excessively large, the strength of the binder may be reduced.

The polymethyl methacrylate particles may have a polar functional group on the surfaces thereof. The polar functional group may form various bonds, such as hydrogen bond and covalent bond, with the binder polymer. For example, the polar functional group may be a carboxylic group or a hydroxyl group. However, the polar functional group is not limited thereto, and any polar functional group may be used so long as it may form a bond with the binder polymer.

The binder polymer may have a polar functional group on at least a portion of the main chain and/or the side chain. The polar functional group may form various bonds, such as hydrogen bond and covalent bonds with the polymethyl methacrylate particles. The polar functional group may be a carboxylic group or a hydroxyl group. However, the polar functional group is not limited thereto, and any polar functional group may be used so long as it may form a bond with the polymethyl methacrylate particles.

In some embodiments, the polymethyl methacrylate particles and the binder polymer may form a composite. That is, the polymethyl methacrylate particles and the binder polymer may further include a chemical bond which is formed by reacting the polar functional group on the surfaces of the polymethyl methacrylate particles and the polar functional group at the end of the binder polymer together, in addition to a physical bond such as a van der Waals bond.

In some embodiments, the weight ratio of the polymethyl methacrylate particles to the binder polymer in the binder may be in the range of about 100:1 to about 100:60. In some embodiments, based on the dry weight, the binder may include the polymethyl methacrylate particles in an amount of about 1 part by weight to about 60 parts by weight based on 100 parts by weight of the binder polymer. In some embodiments, based on the dry weight, the binder may include the polymethyl methacrylate particles in an amount of about 5 parts by weight to about 60 parts by weight based on 100 parts by weight of the binder polymer. In some embodiments, based on the dry weight, the binder may include the polymethyl methacrylate particles in an amount of about 10 parts by weight to about 60 parts by weight based on 100 parts by weight of the binder polymer. When the amount of the polymethyl methacrylate particles is excessively low, the elasticity of the binder may be reduced. When the amount of the polymethyl methacrylate particles is excessively high, the addition of the electrolyte solution may be difficult.

The binder for a battery may have one or more glass transition temperatures. In some embodiments, the binder for a battery may have a single glass transition temperature. In some embodiments, the binder for a battery may have two glass transition temperatures.

The binder for a battery may have one or more glass transition temperatures of about 60° C. or less. In some embodiments, the binder for a battery may have one or more glass transition temperatures of about 50° C. or less. In some embodiments, the binder for a battery may have one or more glass transition temperatures of about 40° C. or less.

The glass transition temperature of the binder for a battery may be in the range of about −50° C. to about 60° C. In some embodiments, the glass transition temperature of the binder for a battery may be in the range of about −40° C. to about 50° C. In some embodiments, the glass transition temperature of the binder for a battery may be in the range of about −30° C. to about 40° C.

The polymethyl methacrylate particles in the binder for a battery may be crosslinked polymethyl methacrylate particles that do not have a glass transition temperature. The crosslinked polymethyl methacrylate particles are not particularly limited and may be prepared by various methods such as emulsion polymerization and solution polymerization. Also, reaction conditions used in the above methods may be appropriately controlled by a person skilled in the art. The crosslinked polymethyl methacrylate particles may be prepared in the form of an aqueous dispersion having a solid content of about 15% or less.

In some embodiments, the binder polymer may include one or more selected from the group consisting of a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, polytetrafluoroethylene, polyethylene, polypropylene, an ethylene-propylene copolymer, polyethylene oxide, polyvinylpyrrolidone, polyepichlorohydrin, polyphosphazene, polyacrylate, polyacrylonitrile, polystyrene, an ethylene-propylene-diene copolymer, polyvinylpyridine, chlorosulfonated polyethylene, latex, a polyester resin, an acrylic resin, a phenolic resin, an epoxy resin, polyvinyl alcohol, carboxymethyl cellulose, hydroxypropyl methyl cellulose, hydroxypropyl cellulose, and diacetyl cellulose. However, the binder polymer is not limited thereto, and any binder polymer may be used so long as it may be used as an aqueous binder in the art.

Examples of a monomer used for preparing the binder polymer may be an ethylenically unsaturated carboxylic acid alkyl ester such as methyl methacrylate, butyl methacrylate, ethyl methacrylate, and 2-ethylhexyl methacrylate; a cyano group-containing ethylenically unsaturated monomer such as acrylonitrile, methacrylonitrile, α-chloro-acrylonitrile, α-cyanoethyl acrylonitrile; a conjugated diene monomer such as 1,3-butadiene, isoprene, 2,3-dimethyl-1,3-butadiene, 2-ethyl-1,3-butadiene, 1,3-pentadiene, and chloroprene; an ethylenically unsaturated carboxylic acid, such as acrylic acid, methacrylic acid, maleic acid, fumaric acid, and citraconic acid, and a salt thereof; an aromatic vinyl monomer such as styrene, alkylstyrene, and vinyl naphthalene; a fluoroalkyl vinylether such as fluoroethyl vinylether; vinylpyridine; a non-conjugated diene monomer such as vinylnorbornene, dicyclopentadiene, and 1,4-hexadiene; an α-olefin such as ethylene and propylene; an ethylenically unsaturated amide monomer such as methacrylamide. However, the monomer is not necessarily limited to the above, and any suitable monomer may be used as long.

The binder polymer is not particularly limited and may be prepared by various methods such as emulsion polymerization and solution polymerization. Also, reaction conditions used in the above methods may be appropriately controlled by a person skilled in the art.

The binder may further include a coupling agent. The coupling agent may be a silane-based compound. The coupling agent may be a hydrolysate of a silane coupling agent.

In some embodiments, the silane coupling agent may be a silane-based compound having a hydrolytic functional group. The hydrolytic functional group is a functional group that may be bonded to the methyl methacrylate particles and the binder polymer after hydrolysis. For example, the silane coupling agent may include one or more selected from the group consisting of an alkoxy group, a halogen group, an amino group, a vinyl group, a glycidoxy group, an acyloxy group, and a hydroxyl group.

In some embodiments, the silane coupling agent may include one or more selected from the group consisting of vinylalkylalkoxysilane, epoxyalkylalkoxysilane, mercaptoalkylalkoxysilane, vinylhalosilane, and alkylacyloxysilane.

In some embodiments, the silane coupling agent may include one selected from the group consisting of vinyltris(β-methoxyethoxy)silane, γ-methacryloxypropyltrimethoxysilane, γ-glycidoxypropyltrimethoxysilane, β-(3,4-epoxycyclohexyl)ethyltrimethoxysilane, γ-glycidoxypropylmethyldiethoxysilane, γ-aminopropyltrimethoxysilane, γ-mercaptopropyltrimethoxysilane, γ-chloropropyltrimethoxysilane, vinyltrichlorosilane, and methyltriacetoxysilane. However, the silane coupling agent is not necessarily limited thereto, and any silane coupling agent may be used as long as it is used in the art.

In some embodiments, based on the dry weight, the amount of the coupling agent used in the preparation of the binder may be about 10 wt % or less based on the total weight of reactants. In some embodiments, based on the dry weight, the amount of the coupling agent used in the preparation of the binder may be about 5 wt % or less based on the total weight of the reactants. In some embodiments, based on the dry weight, the amount of the coupling agent used in the preparation of the binder may be about 3 wt % or less based on the total weight of the reactants.

The binder composition for a battery may include polymethyl methacrylate particles; binder polymer particles; and a solvent. In the binder composition, the polymethyl methacrylate particles and the binder polymer particles may be in the state of being dispersed in the solvent while maintaining the particle shape. The polymethyl methacrylate particles may be crosslinked polymethyl methacrylate particles. In some embodiments, the binder composition may be in the state of an emulsion. The binder composition may have a pH level of about 7 to about 11 in order to maintain stability. Ammonia and hydroxides of alkali metals may be used as a pH adjuster. When particle diameters of the polymethyl methacrylate particles and the binder polymer particles, which are dispersed in the binder composition, are excessively small, handling may not be easy due to high viscosity of the emulsion. When the particle diameters of the polymethyl methacrylate particles and the binder polymer particles, which are dispersed in the binder composition, are excessively large, initial adhesion may be reduced.

The binder composition may include the polymethyl methacrylate particles in an amount of about 1 part by weight to about 60 parts by weight based on 100 parts by weight of the binder polymer particles. For example, based on the dry weight, the binder composition may include the polymethyl methacrylate particles in an amount of about 5 parts by weight to about 60 parts by weight based on 100 parts by weight of the binder polymer. For example, based on the dry weight, the binder composition may include the polymethyl methacrylate particles in an amount of about 10 parts by weight to about 60 parts by weight based on 100 parts by weight of the binder polymer. When the amount of the polymethyl methacrylate particles is excessively low, elasticity of the binder may be reduced. When the amount of the polymethyl methacrylate particles is excessively high, a binder, which is prepared from the binder composition, may be difficult to dissolve in an electrolyte solution.

The average particle diameter of the polymethyl methacrylate particles in the binder composition may be in the range of about 10 nm to about 200 nm. In some embodiments, the average particle diameter of the polymethyl methacrylate particles may be in the range of about 10 nm to about 100 nm. In some embodiments, the average particle diameter of the polymethyl methacrylate particles may be in the range of about 20 nm to about 100 nm. When the average particle diameter of the polymethyl methacrylate particles is excessively small, preparation may not be facilitated. When the average particle diameter of the polymethyl methacrylate particles is excessively large, the strength of the binder may be reduced.

The average particle diameter of the binder polymer particles in the binder composition may be in the range of about 50 nm to about 500 nm. For example, the average particle diameter of the binder polymer particles may be in the range of about 60 nm to about 400 nm. In some embodiments, the average particle diameter of the binder polymer particles may be in the range of about 70 nm to about 300 nm. In some embodiments, the average particle diameter of the binder polymer particles may be in the range of about 80 nm to about 200 nm. The strength and elastic modulus of the binder, which is obtained from the binder composition, may be increased within the above average particle diameter range of the binder polymer.

The binder composition may further include a coupling agent. The coupling agent may form covalent bonds by reacting with polar functional groups that exist on the surfaces of the polymethyl methacrylate particles and/or the binder polymer particles. In some embodiments, the polymethyl methacrylate particles and the binder polymer particles may be more strongly bound together by the coupling agent. The coupling agent used in the binder composition may be the same as the coupling agent used in the above-described binder.

In some embodiments, the binder composition may include the coupling agent in an amount ranging from greater than 0 to about 10 parts by weight based on 100 parts by weight of the binder polymer particles. In some embodiments, the binder composition may include the binder polymer particles in an amount ranging from greater than 0 to about 5 parts based on a dry weight basis. In some embodiments, based on the dry weight, the binder composition may include the polymethyl methacrylate particles in an amount greater than 0 to about 3 parts by weight based on 100 parts by weight of the binder polymer particles.

In some embodiments, based on a dry weight, about 10 parts by weight to about 50 parts by weight of the polymethyl methacrylate particles may be mixed with about 0.01 parts by weight to about 5 parts by weight of the coupling agent based on 100 parts by weight of the binder polymer particles in the binder composition. In some embodiments, based on a dry weight, about 10 parts by weight to about 40 parts by weight of the polymethyl methacrylate particles may be mixed with about 0.01 parts by weight to about 3 parts by weight of the coupling agent based on 100 parts by weight of the binder polymer particles.

In some embodiments, the anode may include an anode active material and the above-described binder for a battery.

The anode may include the binder for a battery in which polymethyl methacrylate particles are dispersed. A binder polymer may act as a matrix in the binder for a battery that is included in the anode, and the binder for a battery may have a form in which the polymethyl methacrylate particles are dispersed in the matrix. The binder composition is added to an electrode active material slurry, and the binder is then formed from the binder composition in the process of preparing an anode by removing the solvent from the slurry.

In some embodiments, the anode may be prepared by a method in which an anode active material composition including the anode active material and the binder for a battery is formed in a certain shape or the anode active material composition is coated on a current collector such as a copper foil and the like.

Specifically, an anode active material composition, in which the anode active material, a conductive agent, the binder, and a solvent are mixed together, is prepared. An anode plate is prepared by directly coating the anode active material composition on a metal current collector. Alternatively, the anode active material composition is cast on a separate support, and then an anode plate may be prepared by laminating films detached from the support on a metal current collector. The anode is not limited to the foregoing shapes and may have a shape other than the foregoing shapes.

The anode active material may be a non-carbon-based material. For example, the anode active material may include one or more selected from the group consisting of a metal alloyable with lithium, an alloy of the metal alloyable with lithium, an oxide of the metal alloyable with lithium, transition metal oxide, and non-transition metal oxide.

Examples of the metal alloyable with lithium may include, but are not limited to, silicon (Si), tin (Sn), aluminum (Al), germanium (Ge), lead (Pb), bismuth (Bi), antimony (Sb), an Si—Y alloy (where Y is alkaline metal, alkaline earth metal, a group 13 to 16 element, transition metal, a rare earth element, or a combined element thereof, and provided that the metal alloyable is not Si), an Sn—Y alloy (where Y is alkaline metal, alkaline earth metal, a group 13 to 16 element, transition metal, a rare earth element, or a combined element thereof, and is not Sn), etc. Examples of the element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), Pb, ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), Al, gallium (Ga), Sn (Tin), indium (In), Ge, phosphorus (P), arsenic (As), Sb (Antimony), Bi (Bismuth), sulfur (S), selenium (Se), tellurium (Te), polonium (Po), and combinations thereof.

In some embodiments, the transition metal oxide may be lithium titanate, vanadium oxide, lithium vanadium oxide, etc.

In some embodiments, the non-transition metal oxide may be $SnO_2$, $SiO_x$ ($0<x<2$), etc.

Specifically, the anode active material may include one or more selected from the group consisting of Si, Sn, Pb, Ge, Al, $SiO_x$ ($0<x\leq2$), $SnO_y$ ($0<y\leq2$), $Li_4Ti_5O_{12}$, $TiO_2$, $LiTiO_3$, and $Li_2Ti_3O_7$. However, the anode active material is not necessarily limited thereto, and any anode active material may be used so long as it is used as a non-carbon-based anode active material in the art.

In some embodiments, the composition of a non-carbon-based anode active material and a carbon-based material may be used, and a carbon-based anode active material may be further included in addition to the non-carbon-based material.

The carbon-based material may include crystalline carbon, amorphous carbon, or a mixture thereof. The crystalline carbon may be graphite such as amorphous, plate, flake, spherical, or fibrous natural graphite or artificial graphite. In some embodiments, the amorphous carbon may be soft carbon (low-temperature fired carbon) or hard carbon, mesophase pitch carbide, fired coke, etc.

Examples of the conductive agent may be acetylene black, Ketjen black, natural graphite, artificial graphite, carbon black, acetylene black, carbon fibers, metal powders such as copper, nickel, aluminum, or silver, metal fibers, etc. Also, the conductive agent may be used by mixing one or more conductive materials such as a polyphenylene derivative. However, the conductive agent is not limited thereto and any conductive agent known in the art may be used. Further, the above-described crystalline carbon-based material may be included as a conductive agent.

In some embodiments, a typical binder may further be used in addition to the above binder. Examples of a typical binder may be vinylidene fluoride/hexafluoropropylene copolymer, polyvinylidene fluoride (PVDF), polyacrylonitrile, poly(methyl methacrylate), polytetrafluoroethylene, and mixtures thereof. In some embodiments, a typical binder can also be a styrene butadiene rubber-based polymer. However, the binder is not limited thereto and any binder known in the art may be used.

Examples of a solvent may be N-methylpyrrolidone, acetone, water, etc. However, the solvent is not limited thereto and any solvent may be used as long as it is known in the art.

The amount of the anode active material, conductive agent, typical binder, and solvent are based on the typical amounts used in a lithium battery. One or more of the conductive agent, typical binder, and solvent may be omitted according to applications and configurations of the lithium batteries.

In some embodiments, the lithium battery may use the anode described herein. The lithium battery may be prepared according to the following method.

First, an anode is prepared according to a method of preparing the anode that is known in the art.

Next, a cathode active material composition, in which a cathode active material, a conductive agent, a binder and a solvent are mixed together, is prepared. The cathode active material composition is directly coated on a metal current collector and dried to prepare a cathode plate. Alternatively, the cathode active material composition is cast on a separate support and then a cathode plate may be prepared by laminating films detached from the support on a metal current collector.

The cathode active material may include one or more materials selected from the group consisting of lithium cobalt oxide, lithium nickel cobalt manganese oxide, lithium nickel cobalt aluminum oxide, lithium iron phosphate, lithium manganese oxide, and combinations thereof. However, the cathode active material is not limited thereto and any cathode active material may be used as long as it is known in the art.

For example, a compound expressed as one of the following chemical formulas may be used: $Li_aA_{1-b}B_bD_2$ (where $0.90 \leq a \leq 1.8$, $0 \leq b \leq 0.5$); $Li_aE_{1-b}B_bO_{2-c}D_c$ (where $0.90 \leq a \leq 1.8$, $0 \leq b \leq 0.5$, $0 \leq c \leq 0.05$); $LiE_{2-b}B_bO_{4-c}D_c$ (where $0 \leq b \leq 0.5$, $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, $0 < \alpha < 2$); $Li_aNi_{1-b-c}Co_bB_cO_{2-\alpha}F_2$ (where $0.90 \leq a \leq 1.8$, $0 \leq b \leq 0.5$, $0 \leq c \leq 0.05$, $0 < \alpha < 2$); $Li_aNi_{1-b-c}Mn_bB_cD^1_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}F^1_2$ (where $0.90 \leq a \leq 1.8$, $0 \leq b \leq 0.5$, $0 \leq c \leq 0.05$, $0 < \alpha < 2$); $Li_aNi_bE_cG_dO_2$ (where $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is nickel (Ni), cobalt (Co), manganese (Mn), or a combination thereof; B is Al, Ni, Co, Mn, Cr, Fe, Mg, Sr, V, rare earth elements, or a combination thereof; $D^1$ is oxygen (O), fluorine (F), S, P, or a combination thereof; E is Co, Mn, or a combination thereof; $F^1$ is F, S, P, or a combination thereof; G is Al, Cr, Mn, Fe, Mg, lanthanum (La), cerium (Ce), Sr, V, or a combination thereof; Q is Ti, Mo, Mn, or a combination thereof; $I^1$ is Cr, V, Fe, Sc, Y, or a combination thereof; J is V, Cr, Mn, Co, Ni, Cu, or a combination thereof.

In some embodiments, a compound having a coating layer on the foregoing compounds may be used. In some embodiments, a composition may be used by mixing the foregoing compounds and the compound having a coating layer. The coating layer may include a compound of a coating element such as oxide, hydroxide, oxyhydroxide, oxycarbonate, or hydroxycarbonate of a coating element. The compound constituting the coating layer may be amorphous or crystalline. Examples of the coating element included in the coating layer may be Mg, Al, Co, potassium (K), sodium (Na), Ca, Si, Ti, V, Sn, Ge, Ga, B, As, Zr, and mixtures thereof. Any coating method may be used for a process of forming a coating layer as long as coating may be performed by a method (e.g., spray coating, dipping, etc.) that does not adversely affect the physical properties of the cathode active material due to using such coating elements on the foregoing compounds. Detailed description related to the coating method is not provided because it is obvious to those skilled in the art.

Examples of the cathode active material may be $LiNiO_2$, $LiCoO_2$, $LiMn_xO_{2x}$ (x=1, 2), $LiNi_{1-x}Mn_xO_2$ ($0 < x < 1$), $LiNi_{1-x-y}Co_xMn_yO_2$ ($0 \leq x \leq 0.5$, $0 \leq y \leq 0.5$); $LiFeO_2$, $V_2O_5$, TiS, MoS, etc.

The conductive agent, binder, and solvent in the cathode active material composition may be used the same as those in the anode active material composition. Pores may be formed within an electrode plate by further adding a plasticizer to the cathode active material composition and/or anode active material composition.

The amounts of the cathode active material, conductive agent, typical binder, and solvent are amounts typically used in a lithium battery. One or more of the conductive agent, typical binder, and solvent may be omitted according to applications and configurations of lithium batteries.

Next, a separator, which will be inserted between the cathode and the anode, is prepared. Any separator that is typically used in a lithium battery may be used as the separator. A separator having high moisture-retention ability for an electrolyte as well as low resistance to the transfer of electrolyte ions may be used. Examples of the separator may be one selected from the group consisting of glass fibers, polyester, Teflon, polyethylene, polypropylene, polytetrafluoroethylene (PTFE), and combinations thereof. The separator may be a nonwoven or woven fabric type. For example, a windable separator such as polyethylene or polypropylene is used in a lithium-ion battery, and a separator having high moisture-retention ability for an organic electrolyte may be used in a lithium-ion polymer battery. For example, the separator may be prepared according to the following method.

In some embodiments, the separator composition is prepared by mixing a polymer resin, a filler, and a solvent. The separator composition is directly coated on an upper portion of an electrode and dried to prepare a separator. Also, the separator composition is cast and dried on a support, and then a separator may be prepared by laminating separator films detached from the support on an upper portion of an electrode.

A polymer resin used in the preparation of the separator is not particularly limited thereto and any material used in the binder for an electrode plate may be used. Examples of the polymer resin may be vinylidene fluoride/hexafluoropropylene copolymer, PVDF, polyacrylonitrile, poly(methyl methacrylate), and mixtures thereof.

Next, an electrolyte is prepared.

In some embodiments, the electrolyte may be an organic electrolyte. In some embodiments, the electrolyte may be a solid. For example, the electrolyte may be boron oxide, lithium oxynitride, etc. However, the electrolyte is not limited thereto and any electrolyte may be used so long as it may be used as a solid electrolyte in the art. The solid electrolyte may be formed on the anode by using a method such as sputtering.

In some embodiments, an organic electrolyte may be prepared. The organic electrolyte may be prepared by dissolving a lithium salt in an organic solvent.

Any suitable organic solvent known in the art may be used as long as it is. Examples of the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, and mixtures thereof.

Any suitable lithium salt known in the art may be used. Examples of the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, and mixtures thereof.

As shown in FIG. 1, a lithium battery 1 includes a cathode 3, an anode 2, and a separator 4. The cathode 3, anode 2, and separator 4 are wound and folded to be enclosed in a battery case 5. Subsequently, an organic electrolyte solution is injected into the battery case 5 and the lithium battery 1 is completed by being sealed with a cap assembly 6. The battery case 5 may be a cylindrical, rectangular, or thin-film type. For example, the lithium battery 1 may be a thin-film type battery. The lithium battery 1 may be a lithium-ion battery.

A separator is disposed between the cathode and the anode such that a battery structure may be formed. The battery structure is stacked in a bi-cell structure, and then combined with an organic electrolyte solution. A lithium-ion polymer battery is completed when the resulted product is contained in a pouch and sealed.

Also, battery structures are stacked to form a battery pack, and the battery pack may be used in all devices requiring high capacity and high power. For example, the battery pack may be used in a notebook, smartphone, or electric vehicle (EV).

Particularly, because the lithium battery has excellent high-rate and life characteristics, it is appropriate for an EV. For example, the lithium battery is appropriate for a hybrid vehicle (HV) such as a plug-in hybrid electric vehicle (PHEV).

The present invention is described in more detail according to examples and comparative examples below. However, examples only exemplify the present invention, and the scope of the present invention is not limited thereto.

Preparation of First Polymer Emulsion

PREPARATION EXAMPLE 1

After flushing nitrogen in a flask reactor equipped with a condenser, a thermometer, a monomer emulsion inlet tube, a nitrogen gas inlet tube, and a stirrer, about 60 parts by weight of distilled water and about 1.5 parts by weight of dodecylbenzenesulfonic acid sodium salt were added, and the temperature was increased to about 80° C. Subsequently, about 2 parts by weight of styrene was added to the reactor and stirred for about 5 minutes. Then, about 10 parts by weight of a 5% aqueous solution of ammonium persulfate was added to the reactor to initiate a reaction. After about 1 hour, a monomer emulsion, which included about 30 parts by weight of 2-ethylhexyl acrylate, about 68 parts by weight of styrene, about 2 parts by weight of acrylic acid, about 0.5 parts by weight of a dodecylbenzenesulfonic acid sodium salt, and about 40 parts by weight of distilled water, was dropped into the reactor for about 3 hours. Simultaneously, about 6 parts by weight of the 5% aqueous solution of ammonium persulfate was dropped into the reactor for about 3 hours. After finishing the addition of the monomer emulsion, the reaction was then further performed for about 2 hours. Then, the reactor were cooled to 20° C., a 5 wt % lithium hydroxide aqueous solution was added into the reactor to adjust the pH level to about 8.5, the residual monomer was removed under reduced pressure, and then a polymer emulsion having a solid content of about 40% was obtained. The particle diameter of polymer particles dispersed in the emulsion was in the range of about 100 nm to about 200 nm, and the average particle diameter was about 120 nm.

PREPARATION EXAMPLE 2

After flushing nitrogen in a 10 L autoclave reactor, about 60 parts by weight of distilled water and about 1.5 parts by weight of dodecylbenzenesulfonic acid sodium salt were then added, and the temperature was increased to about 70° C. Subsequently, about 2 parts by weight of styrene was added to the reactor and stirred for about 5 minutes. Then, about 10 parts by weight of a 2% aqueous solution of potassium persulfate was added to the reactor to initiate a reaction. After about 1 hour, a monomer emulsion, which included about 40 parts by weight of butadiene, about 46 parts by weight of styrene, about 10 parts by weight of methyl methacrylate, about 3 parts by weight of itaconic acid, about 1 part by weight of hydroxyethyl acrylate, about 0.5 parts by weight of a dodecylbenzenesulfonic acid sodium salt, and about 40 parts by weight of distilled water, was added to the reactor for about 4 hours. Simultaneously, about 10 parts by weight of the 2% aqueous solution of potassium persulfate was added to the reactor for about 3 hours. After finishing the addition of the monomer emulsion, the reaction was then further performed for about 3 hours. Then, the reactor was cooled to 20° C., the residual monomer was removed under reduced pressure, and the polymer emulsion was obtained. The polymerization rate was about 98.9%. A 5 wt % lithium hydroxide aqueous solution was added to the polymer emulsion to adjust the pH level to about 7.5, and thus, the solid content of the polymer emulsion was adjusted to about 40%.

Preparation of Binder Composition

EXAMPLE 1

Based on the dry weight, about 30 parts by weight of a crosslinked polymethyl methacrylate emulsion (EPOSTAR MX030W, Nippon Shokubai, Japan) having an average particle diameter of about 50 nm was added to about 100 parts by weight of the polymer emulsion (solid content of about 40%) prepared in accordance with the Preparation Example 1 and stirred for about 10 minutes to prepare a binder composition.

EXAMPLE 2

A binder composition was prepared in the same manner as in Example 1 except that the polymer emulsion prepared in Preparation Example 2 was used.

EXAMPLE 3

Based on the dry weight, about 30 parts by weight of a crosslinked polymethyl methacrylate emulsion (EPOSTAR MX030W, Nippon Shokubai, Japan) having an average particle diameter of about 50 nm was added to about 100 parts by weight of the polymer emulsion (solid content of about 40%) prepared in Preparation Example 2 and stirred for about 10 minutes. Then, about 0.2 parts by weight of γ-glycidoxypropyltrimethoxysilane as a silane coupling agent was added and stirred for about 20 minutes to prepare a binder composition.

COMPARATIVE EXAMPLE 1

The polymer emulsion prepared in accordance with the Preparation Example 1 was used as a binder.

COMPARATIVE EXAMPLE 2

The polymer emulsion prepared in accordance with the Preparation Example 2 was used as a binder.

Preparation of Anode and Lithium Battery

EXAMPLE 4

An Si—Fe alloy active material (CV3, 3M, St. Paul, Minn., USA) having an average particle diameter ($d_{50}$) of about 3 µm, artificial graphite (MAG, Hitachi Chemical Co., Ltd., Tokyo, Japan), and carboxymethyl cellulose (CMC) were mixed in pure water, and the active material slurry was then prepared to obtain a weight ratio of Si—Fe alloy:graphite:CMC:binder (solid content) of about 20:77:1:2 by combining with the binder composition prepared in Example 1.

A copper foil with an original thickness of about 10 µm was coated with the active material slurry to a thickness of about 90 µm, and then dried at about 110° C. for about 0.5 hours. Then, an anode plate was prepared by roll-pressing the coated copper foil to a thickness of about 70 µm. A coin cell (CR2016 type) having a diameter of about 32 mm was prepared.

Metallic lithium was used as a counter electrode for the preparation of the coin cell, an about 20 µm thick polyethylene separator (Star 20) was used as a separator, and an electrolyte used was prepared by dissolving about 1.15 M $LiPF_6$ in a solvent mixture of ethylene carbonate (EC):ethylmethyl carbonate (EMC):diethyl carbonate (DEC) (a volume ratio of about 3:3:4).

EXAMPLE 5

An anode and a lithium battery were prepared in accordance with the same procedures described in Example 4 except that the binder composition prepared in Example 2 was used.

EXAMPLE 6

An anode and a lithium battery were prepared in accordance with the same procedures described in Example 4 except that the binder composition prepared in Example 3 was used.

COMPARATIVE EXAMPLES 3 AND 4

Anodes and lithium batteries were prepared in accordance with the same procedures described in Example 4 except that the binder compositions prepared in Comparative Examples 1 and 2 were respectively used.

EVALUATION EXAMPLE 1

Glass Transition Temperature Test

Substrates were respectively coated with the binder compositions of Examples 1 to 3 and Comparative Examples 1 and 2, and solvents were then removed by drying at room temperature for about 24 hours. Then, binder samples were respectively prepared by separating films from the substrates. Glass transition temperatures of the binder samples were measured using a differential scanning calorimeter (DSC).

The glass transition temperature of the binder sample prepared from the binder composition of Example 1 was about 18° C.

EVALUATION EXAMPLE 2

High-Temperature Elastic Modulus Measurement

Substrates were respectively coated with the binder compositions of Examples 1 to 3 and Comparative Examples 1 and 2, and solvents were then removed by drying at room temperature for about 24 hours. Then, binder samples were respectively prepared by separating films from the substrates.

Changes in strain according to stress tests were measured for the binder samples using a tensile tester manufactured by Instron Corporation according to ASTM standards. Elastic moduli (E) of the binders at 60° C. were calculated from the slopes of stress-strain graphs.

TABLE 1

|  | Elastic Modulus [$10^9$ Pa] |
|---|---|
| Example 1 | 8 |
| Example 2 | 53 |
| Example 3 | 27 |
| Comparative Example 1 | 7 |
| Comparative Example 2 | 2 |

As illustrated in Table 1, the binders obtained from the binder compositions of Examples 1 to 3 had increased elastic moduli in comparison to the binders of Comparative Examples 1 and 2.

EVALUATION EXAMPLE 3

Charge and Discharge Characteristics and Electrode Expansion Ratio Evaluation

The coin cells prepared in Examples 4 to 6 and Comparative Examples 3 and 4 were charged at a 0.2 C constant current rate to a voltage of 0.01 V (vs. lithium (Li)) at 25° C. and charged to a current of 0.01 C while maintaining a constant voltage of 0.01 V. Subsequently, the coin cells were discharged at a 0.2 C constant current until the voltage reached 1.5 V (vs. Li) during discharging (formation operation).

The lithium batteries subjected to the above formation operation were charged at a 0.5 C constant current rate to a voltage of 0.01 V (vs. Li) at 25° C. and charged to a current of 0.01 C while maintaining a constant voltage of 0.01 V. Subsequently, the lithium batteries were discharged at a 0.5 C constant current until the voltage reached 1.5 V (vs. Li) during discharging, and the above cycle was repeated 30 times.

Some of the results of charge and discharge experiments are presented in Table 2 below. The capacity retention ratio and the electrode expansion ratio are defined as the following Equations 1 and 2, respectively.

The electrode expansion ratio was calculated from the following Equation 2 by respectively measuring a thickness of an anode before assembling into a battery and a thickness of an anode after disassembling the battery after 30 charge and discharge cycles and then removing the electrolyte.

Capacity retention ratio [%]=[discharge capacity at a 30th cycle/discharge capacity at the 1st cycle]×100   <Equation 1>

Electrode expansion ratio [%]=[thickness of an anode after 30 charge and discharge cycles/thickness of an unused anode]×100   <Equation 2>

TABLE 2

| | Capacity retention ratio in a 30th cycle |
|---|---|
| Example 4 | 89.4 |
| Example 5 | 90.6 |
| Example 6 | 90.4 |
| Comparative Example 3 | 83.7 |
| Comparative Example 4 | 83.8 |

As illustrated in Table 2, the lithium batteries of Examples 4 to 6 exhibited increased the battery cycle life characteristics in comparison to the lithium batteries of Comparative Examples 3 to 4.

Also, the electrode expansion ratios of the lithium batteries of Examples 4 to 6 were significantly reduced in comparison to electrode expansion ratios of the lithium batteries of Comparative Examples 3 to 4. For example, the electrode expansion ratios of the lithium batteries of Examples 4 to 6 were about 40% or less. However, the electrode expansion ratios of the lithium batteries of Comparative Examples 3 to 4 were about 60% or more.

Therefore, since the electrode expansion ratios of the lithium batteries of Examples 4 to 6 including the binders having increased strength or elastic modulus were reduced, the battery life characteristics of the lithium batteries were increased.

As described above, the cycle characteristics of a lithium battery may be increased by including a binder which includes polymethyl methacrylate particles and a binder polymer.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An anode comprising:
an anode active material; and
a binder for a battery comprising
polymethyl methacrylate particles and
a binder polymer;
wherein the anode comprises the binder for the battery in which polymethyl methacrylate particles are dispersed;
wherein the anode active material comprises one or more selected from the group consisting of silicon (Si) and SiOx (0<x≤2);
wherein the binder for a battery has a form in which the polymethyl methacrylate particles are dispersed in the matrix; and
wherein the polymethyl methacrylate particles in the binder for the battery are crosslinked polymethyl methacrylate particles that do not have a glass transition temperature.

2. The anode of claim 1, wherein an average particle diameter of the polymethyl methacrylate particles is in the range of about 10 nm to about 200 nm.

3. The anode of claim 1, wherein the weight ratio of the polymethyl methacrylate particles to the binder polymer is in the range of about 100:10 to about 100:60.

4. The anode of claim 1, wherein the binder for the battery has one or more glass transition temperatures.

5. The anode of claim 1, wherein the binder for the battery has one or more glass transition temperatures of about 60° C. or less.

6. The anode of claim 1, wherein the glass transition temperature of the binder for the battery is in the range of about −50° C. to about 60° C.

7. The anode of claim 1, further comprising a coupling agent.

8. The anode of claim 7, wherein the coupling agent is a silane-based compound.

9. The anode of claim 7, wherein the coupling agent is a hydrolysate of a silane coupling agent.

10. The anode of claim 9, wherein the silane coupling agent comprises one or more selected from the group consisting of an alkoxy group, a halogen group, an amino group, a vinyl group, a glycidoxy group, and a hydroxyl group.

11. The anode of claim 9, wherein the silane coupling agent comprises one or more selected from the group consisting of vinylalkylalkoxysilane, epoxyalkylalkoxysilane, mercaptoalkylalkoxysilane, vinylhalosilane, and alkylacyloxysilane.

12. The anode of claim 1, wherein the anode active material further comprises a carbon-based anode active material.

13. A lithium battery using the anode of claim 1.

* * * * *